April 3, 1956

K. B. KILBORN ET AL 2,740,459

METHOD AND APPARATUS FOR BUILDING
WIRE REINFORCED CONVEYOR BELTS

Filed June 23, 1951

*INVENTOR.*
KARL B. KILBORN
PAUL D. SULOFF

BY

*ATTORNEY*

April 3, 1956

K. B. KILBORN ET AL 2,740,459

METHOD AND APPARATUS FOR BUILDING
WIRE REINFORCED CONVEYOR BELTS

Filed June 23, 1951

INVENTOR.
KARL B. KILBORN
PAUL D. SULOFF
BY

*P. L. Miller*
ATTORNEY

April 3, 1956

K. B. KILBORN ET AL
METHOD AND APPARATUS FOR BUILDING
WIRE REINFORCED CONVEYOR BELTS 2,740,459

Filed June 23, 1951

*INVENTOR.*
KARL B. KILBORN
BY PAUL D. SULOFF

*R. L. Miller*
ATTORNEY

United States Patent Office 2,740,459
Patented Apr. 3, 1956

2,740,459

METHOD AND APPARATUS FOR BUILDING WIRE REINFORCED CONVEYOR BELTS

Karl B. Kilborn and Paul D. Suloff, Akron, Ohio, assignors, by mesne assignments, to The Goodyear Tire & Rubber Company, a corporation of Ohio Application June 23, 1951, Serial No. 233,162

33 Claims. (Cl. 154—3)

The present invention relates particularly to the building of flat conveyor belts and especially to the building of the tension section of the belt. After the tension section is built, additional plies of fabric may be applied to the tension section in any well-known manner to complete the belt. The invention also contemplates that the tension section may be made up of more than one layer of tension elements which may be plied up, one on top of the other, after each tension section is made.

This invention relates particularly to the manufacture of conveyor belting and particularly to a flat belt having a great many tension elements extending longitudinally thereof and arranged in substantially parallel relation to each other. The tension elements need not all be of the same type. For example, the belt may contain a group of wire cords at each edge with other spaced groups of wires in between. Interspersed between these groups are filler cords of cotton, rayon or the like to make up the full tension section of the belt.

In making belts of this character, it is important that all of the tension elements be arranged in parallel relation or substantially so and, in addition, it is very essential that each of the tension elements should have the same tension while being built into the belt, particularly when wire is employed as it has substantially no longitudinal yield. Particularly with a long belt of this character, although it is also true of shorter belts, it is difficult to keep the belt perfectly aligned while it is being driven if the tension elements are unequally tensioned as there is a tendency for the belts not to track or to run to one side or the other, thus decreasing the efficiency of the belt and making it difficult to operate the belt smoothly, without damage and to full capacity.

It is not the intention of this invention to merely claim equally tensioned cords for all types of belts because in certain classes of belts, particularly endless belts of relatively short length, it is possible to secure equal tension by training the cords over pulleys and spreading the pulleys to cause the equal tension. However, in what is known as the end type belt, the belts, if they are long, must be built a section at a time because generally plant facilities do not permit the laying out of the cords throughout the entire length prior to the application of the ply material thereto. It is therefore an object of this invention to devise a means and method for tensioning each and every cord individually to the same tension while a section of the belt is being built and to align the tension elements in parallel relation and then hold them in that relation while the ply material (rubber and/or fabric) is applied thereto. A very important part of this invention resides in the maintenance of the cords in parallel relation while a fabricated section of the belt is moved out of the way or from the building position to a storage position so as to present a new section of the belt to the building position. The details of this will be more apparent on a reading of the description.

A belt that is three or four feet wide may have as many as 150 to 200 tension elements or more incorporated therein throughout the width of the belt. It has been found that from a practical standpoint small groups of cords can be worked on and each individual tension element individually tensioned in that group by the use of mechanism that is not too complicated or cumbersome and then, after tensioning, this group of cords can be clamped and another group worked upon in the same manner until all of the groups of cords are tensioned. In short, as contemplated by this invention, individual weights are attached to each cord of a group which give the proper tension to each cord. These weights are provided with clamping means so that they can be clamped to the cords without damaging them and if it were necessary to tension all of some 200 or 250 cords at the same time, it would require a similar number of these weights. From a purely operational standpoint, it would be very undesirable to have this many weights to be applied and removed at one time and, in order to get at some of the cords, the operator would be hampered by weights already in place. Also with such a large group of cords it is much easier to miss a cord that should be tensioned than with a smaller group.

It is therefore an object of this invention to tension and clamp individual small groups until all of the groups throughout the width of the belt are tensioned, after which the ply material, whether it is rubber or fabric, is applied to the parallel tension elements to make up the tension section. It can then be rolled up and transported to another station where the belt is completed.

Other objects of this invention will appear hereinafter as the description thereof proceeds, the novel features, arrangements and combinations being clearly set forth in the specification and in the claims hereunto appended.

Purely for the sake of illustration and without the intention of limiting the invention, the apparatus will be described in connection with the building of a belt in which there are alternate groups of cables and cord fabric, preferably with groups of cables at the outer edges of the belt and with other groups of cables spaced regularly to form, intermediate the edges, spaces in which the groups of filler cords are placed.

Figure 1:
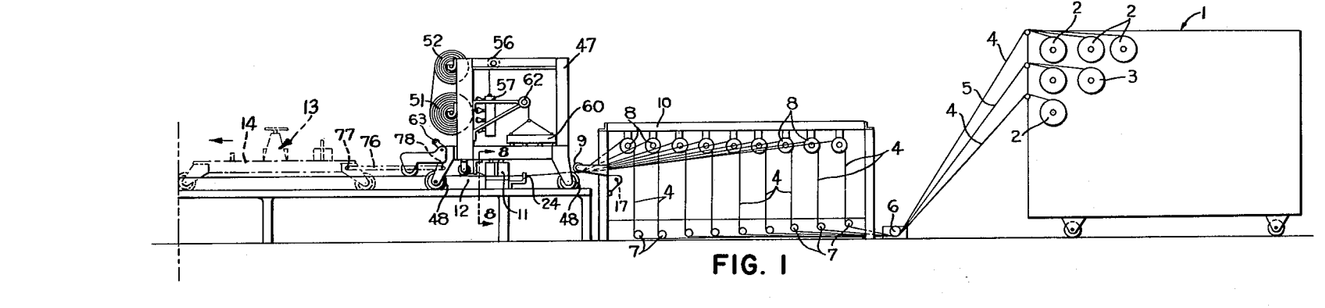
Figs. 1 and 2 are front elevational views of the head and tail ends of the apparatus respectively. These views are somewhat diagrammatic in character.
Figure 2:
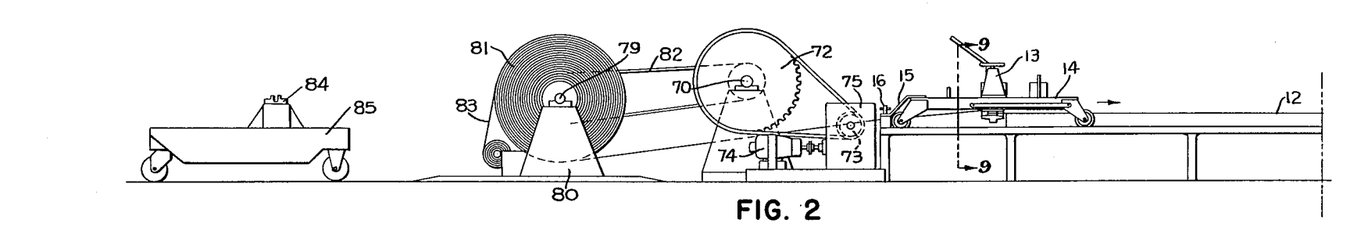

Referring now particularly to Figs. 1 and 2, the reference character 1 indicates a creel. This creel supports spools 2, only a few of which are shown, and these spools carry wire cables, whereas spools 3, only a few of which are shown, carry the cotton or other type filler cords. The arrangement of the spools on the rack is common practice in the art and the necessary arrangement of the respective spools 2 and 3 with respect to each other to feed the tension elements to the belt building portion of the apparatus is well understood in the art. For the sake of simplicity in the description, the tension elements on the spools 2 and 3 will be referred to as cables and cords, respectively. The cables 4 and cords 5 are fed from the spools under a roller 6 to bring them into horizontal alignment with each other. After passing under the roller 6, individual cables or cords of one group are fed over rollers 7 which have their axes arranged transversely to the travel of the tension elements and which are spaced from each other longitudinally of the machine. For the sake of simplicity, in Fig. 1 I have illustrated the tension elements traveling over the rollers 7 as being the cables 4. These cables would form one group, the individual cables of which group are individually tensioned before clamping. These cables are each manually trained upwardly over pulleys 8 and then laterally under a roller 9, all of which are suitably mounted for rotation on a frame 10.

Figure 8:
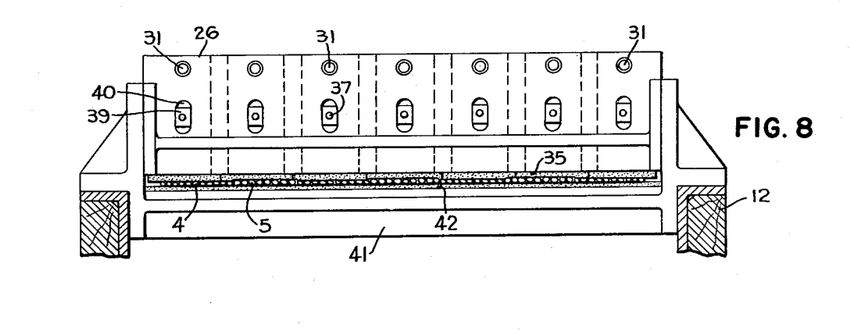

These cables 4 are then fed through a clamping mechanism 11 shown in detail in Figs. 7 and 8, then onto the surface of a table 12 to the clamping mechanism 13 (see Figs. 7 and 9) mounted on a movable carriage 14 which has permissible travel along the table for a purpose later to be described but in the building of the belt at certain stages it is held in fixed position such as shown in Fig. 2. In order to hold the carriage 14 in the position shown in Fig. 2, the carriage is provided with a suitable bracket 15 which is locked in position with respect to the table by a pin 16 arranged in aligned openings in the bracket 15 and table 12.

Figures 5, 9:
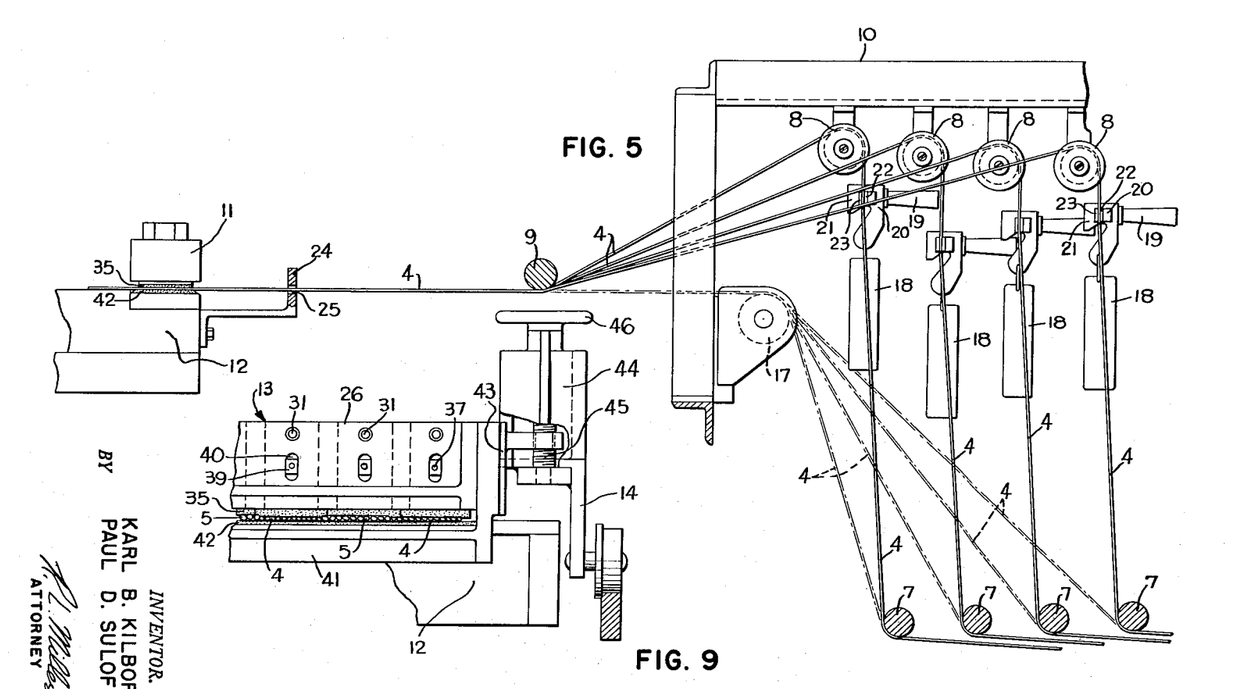
Fig. 5 is an elevational view partly in section showing the means for tensioning the individual tension elements.
Figs. 8 and 9 are elevational views of the clamping members at the head and tail end of the machine taken along lines 8—8 and 9—9 of Figs. 1 and 2, respectively.

With the carriage 14 on table 12 occupying the position shown in Fig. 1 (the former being shown in dotted lines), the ends of the cables are clamped by the clamping mechanism 13 and pass freely through the jaws of the clamp 11 which, in the initial stage, are in the unclamped position. After clamping the ends of the cables by clamp 13, the carriage 14 is moved to the full-line position shown in Fig. 2 in a manner to be described later. The cables are therefore free to be tensioned in a manner which is more clearly illustrated in Fig. 5, which is an enlarged, somewhat exaggerated view showing the means for tensioning the cables. Until a group of cords is selected for individual tensioning of the cables, these cables, instead of traveling upwardly over the pulleys 8, travel upwardly and over a single roller 17 shown by dash-dot lines in Fig. 5. In fact, all of the cables and cords are fed over the roller 17 initially and travel thereover except when the individual cords or groups are selected for tensioning. When a particular group is selected, the individual cables are transferred from the roller 17 to the rollers 8 as shown in Figs. 1 and 5 (solid lines). Individual weights 18, suspended from clamping members 19, are attached to the cables and each weight imparts a tension to the cable to which it is attached. These weights, of course, would all be of the same amount where equal tension is desired. The clamping member 19 has a fixed jaw 20 and a movable jaw 21, each of which has a rubber face such as 22 and 23, respectively. These provide a good gripping surface to grip the cable and when the movable jaw 21 is actuated the cable is clamped firmly between the rubber faces 22 and 23. The rubber faces protect the cables and keep them from being damaged. The details of the clamping mechanism are not important here and are not shown, it being understood that any mechanical means may be used to move the jaws to and from each other for clamping purposes. Actually, in practice a trigger mechanism is used to quickly move the jaws apart when the weight is to be attached to the cable and by the release of the trigger means a spring moves the jaws together.

Each cable is now individually tensioned to the same degree, as the portions of the cables between the clamping member 13 and the weights are free of any substantial restriction as they pass freely over the roller 9 and between the spaced jaws of the clamping member 11.

Comb 24 is of any suitable type and is here shown as a plate with openings 25 which guide the cables and space them laterally in a manner well understood in the art. Instead of the fixed comb, such as shown, combs which provide variable spacing can be used, many of which are well known in the prior art. The jaws of the clamping mechanism 11, designed to clamp this group of cables, are then moved toward each other to clamp the group of cables therebetween, and then the individual weights 18 are removed from the cables 4 and the cables are taken off of the pulleys 8 and laid over the roller 17. Next, another group of cables or cords is treated in a like manner, it being understood that there is a separate pair of jaws in the clamping mechanisms 11 and 13 for each group of cables or cords.

Before proceeding further with a description of the invention, the clamping mechanism will be described and, since both clamping mechanisms are substantially the same, with one exception that will be pointed out as the description proceeds, a description of one will suffice for both and the description will be made in connection with the clamping means 13 as this includes all the elements of clamping mechanism 11 plus something additional, as will be explained later.

Figures 6, 7:
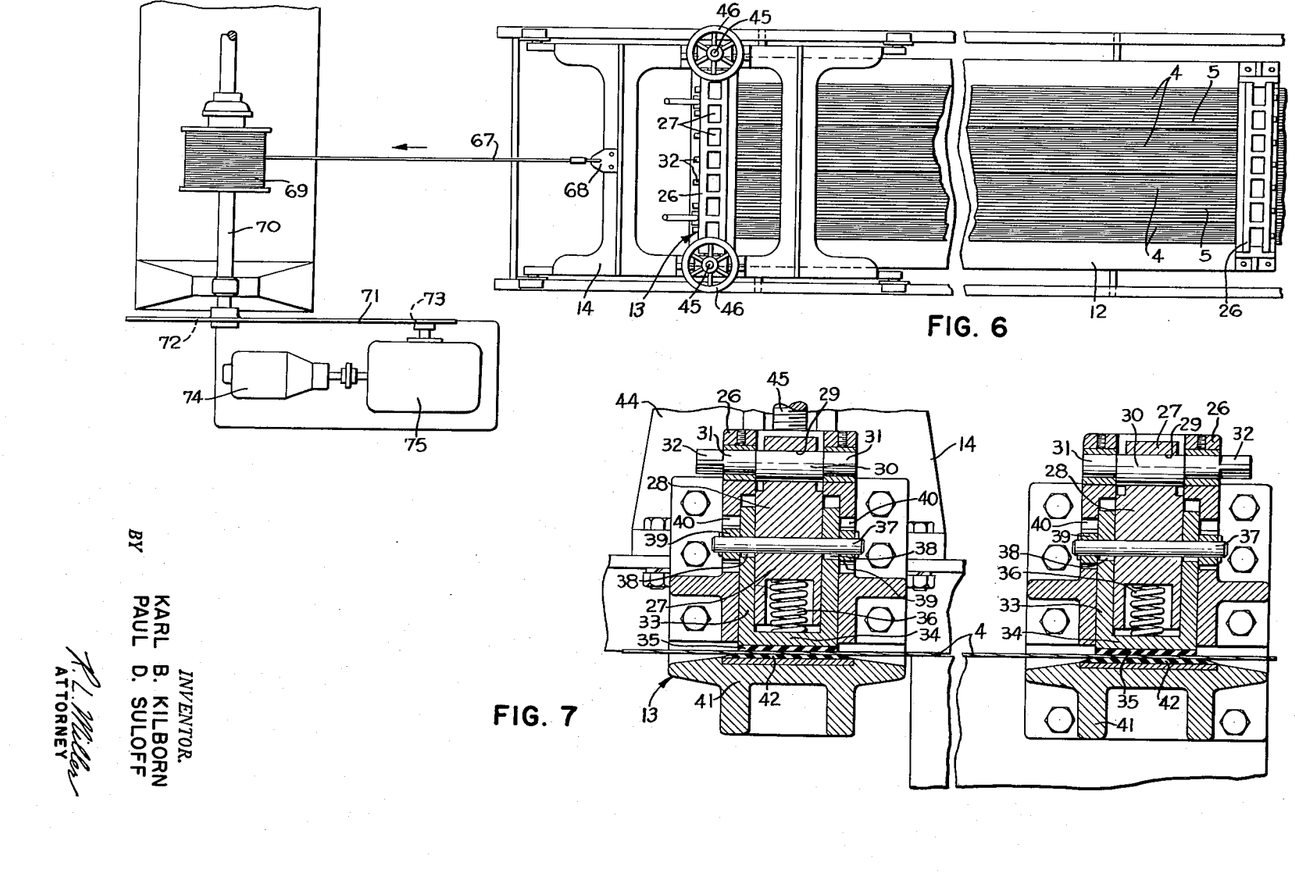
Fig. 6 is a plan view of a portion of the apparatus shown in Figs. 1 and 2.
Fig. 7 is a vertical section through the clamping members showing the details thereof.

In Figs. 6 and 7, 8 and 9 it will be noted that the clamping mechanism designated generally as 13 in Figs. 1, 2, 6, 7 and 9 comprises a transverse frame member 26 mounted rigidly on the carriage 14. In the case of the clamping mechanism 11, it is mounted directly on the table 12 or the supporting frame and it is so mounted as to occupy a fixed position. The clamping mechanism 13 is mounted on the carriage 14 so as to be movable therewith for a purpose to be described later. Arranged transversely of the frame are vertically movable clamping members or jaws designated generally as 27. Fig. 7 shows a detail of the individual clamping members. There is a vertical slot formed in the frame member 26 which receives the clamping body 28 which has a transversely extending slot 29 in the upper end thereof in which an eccentric cam 30 is arranged. This slot is wider in a longitudinal direction than the cam 30 so that as the cam is rotated it will not bind. This cam has extending bearing surfaces 31 rotatable in suitable bearings in the frame 26 and one of the bearing surfaces has an extension 32 which is square to provide a means for applying a wrench thereto to enable the operator to rotate the cam 30 and thus raise or lower the body 28. A hollow tubular clamping member 33 slides over the lower end of the body 28 and is closed at the lower end thereof at 34 and this is provided with a rubber face 35. The clamping member 33 is urged downwardly away from the body 28 by means of a spring 36 arranged within a recess in the body 28 and pressing against the portion 34 of the clamping member 33. A pin 37 extends through the frame and through the clamping member and clamping body 28 and is held in a fixed position with respect to the clamping body. Its ends extend through enlarged openings 38 in the clamping member 33 and the ends are mounted in bearings 39 slidable in vertical ways 40 provided in the frame.

Thus when the cam 30 is rotated by applying a wrench to the part 32, the body 28 is raised or lowered as the case may be. The bearings 39 and pin 37 keep the clamping member from turning and guide it in a vertical direction and the loose connection between the clamping member and body permits a slight amount of movement therebetween whereby when the clamping body is first lowered, a yielding pressure is exerted on the cables and then a positive pressure is imparted to the clamping member when the pin 37 engages the lower side of the opening 38 to positively move the clamp against the cables. A fixed clamping member 41 carries a rubber pad 42 opposing the rubber pad 35 so that the cables are clamped without injury in the clamping mechanism when the clamping pressure is applied.

After each successive group has been tensioned, it is clamped by clamp 11 and the operator moves to the next group to tension that group or it is possible for operators working from opposite sides of the machine to simultaneously or successively tension cables, preferably working from the outer edges of the belt toward the middle. It has been found, as a practical consideration, that it is best to tension a group on one side of the belt and then tension a group at the other side and successively tension similar groups inwardly of those two groups, but it is to be understood that the invention is not so limited.

Both clamping mechanisms 11 and 13 are similarly constructed but in the case of the clamping mechanism 13 the frame member 26 is vertically slidable in ways 43 in the brackets 44 at opposite sides of the carriage 14 and screws 45 having hand wheels 46 are used to rotate the screws and thus bodily raise or lower all of the individual clamping elements at the same time but without changing the clamping relation. Thus, when it becomes necessary to move the carriage from left to right (Figs. 1, 2 and 3) to reclamp another portion of the cables close to the clamping mechanism 11 in a manner to be described later, the clamp 13 is raised from the position shown in Fig. 3 by the hand wheels 46 so that the clamp will clear the working surface of the table 12. Then the carriage can be moved to the right.

Figures 3, 4:
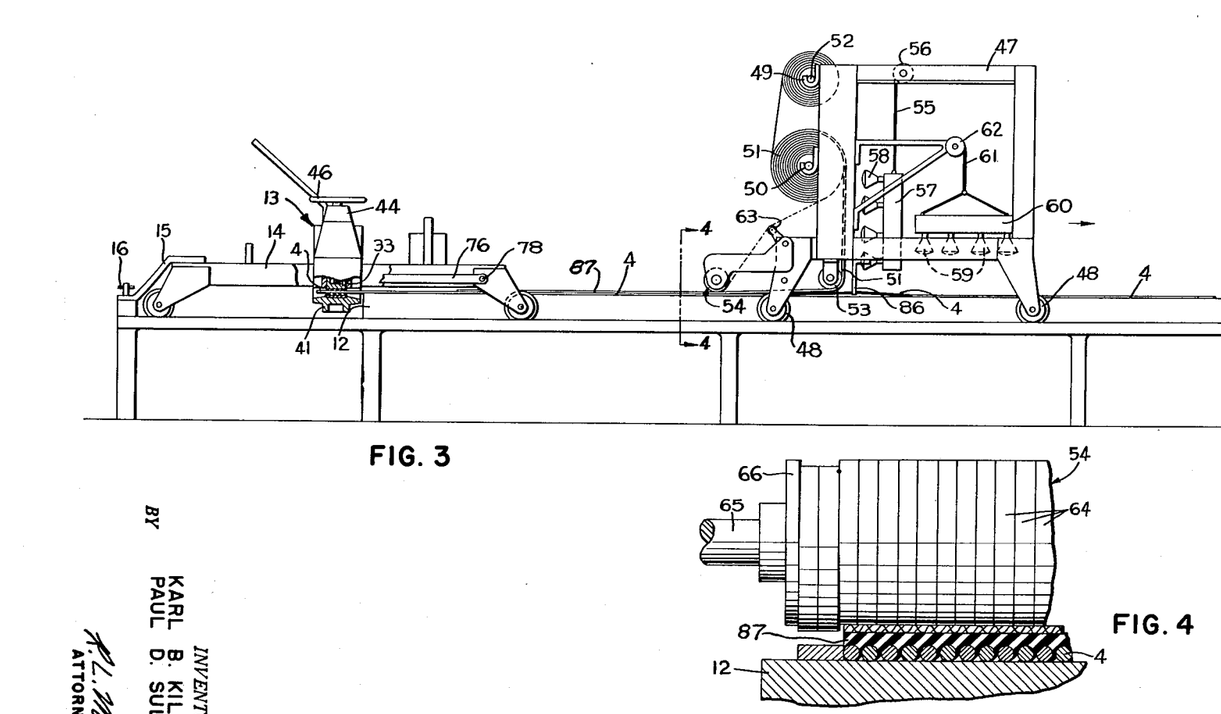
Fig. 3 is a fragmentary front elevational view showing the manner of applying the rubberized coating or ply material to the tension elements.
Fig. 4 is a view looking in the direction 4—4 of Fig. 3 showing the operation of the presser element for pressing the rubber and fabric against the tension elements.

The operation of the mechanism so far described briefly is this: The cables and cords are fed from the spools 2 and 3 to the mechanism mounted on the frame 10 and through the comb 24 and open clamping member 11 to the clamping member 13, both of which are initially in a fixed position longitudinally of the table (as in the dotted-line position of clamp 13 and full-line position of clamp 11 in Fig. 1), the cables being clamped initially in the clamp 13. Then the carriage 14 is moved from the dotted-line position shown in Fig. 1 to the full-line position shown in Fig. 2, the clamping member 11 remaining in the position shown in Fig. 1. The hand wheels 46 are then used to lower the clamp 13 until the cords rest on the table (Fig. 3). The means for moving clamping member 13 will be described later. Then, before operating the clamping mechanism 11, the individual weights 18 are applied to the individual groups of cables to tension them successively, and then individual clamping jaws 27 are operated to clamp each group after it is tensioned. Eventually all of the groups are clamped transversely of the table. In this arrangement, during and after the proper tensioning of the cables, the operator sees to it that the cables on the table are not tangled or overlying one another whereby they present a uniform appearance transversely of the table. The tension imparted to each individual cable insures that the cables will not only have the same amount of tension but will remain in substantially parallel relation to each other.

The cables and cords are now ready for the next operation, which is the application of the material which bonds the cables and cords together and provides a suitable body to which the fabric layers can be applied to form the completed tension section of the belt or at least enough of the tension section so that it can be wound up on a drum and then transferred to a position where the additional layers of fabric can be applied, after which the belt is subjected to the usual curing process in a platen press or any other type of vulcanizing machine found to be suitable for that purpose.

The cables are preferably brass-coated and as they are received from the steel mills are provided with a protective coating, one of such coatings being known as "Cumar" manufactured by Barrett Company, New York. This "Cumar" chemically is composed of a coumarone-indene resin. This coating of "Cumar" is of such a character that when heated it softens and merges into the coating of rubber when the rubber is applied to the wires so that by merely heating the wires and/or the coating and then applying the rubber, a good bond of the rubber to the wires is accomplished. In the case of the cords, any suitable coating can be used on the same to make them adherent to the rubber in a manner which is well understood in the art. Such cords generally carry a coating of rubber latex or some rubber compound which is bonded to the cords and will effect a good bond with the rubber layer applied thereto.

The cushion layer of rubber will adhere to the "Cumar" coated wires and to the cords more readily if it is heated and therefore provision is made for heating the rubber prior to its application to the cords in addition to providing mechanism for heating the wires before or during the application of the cushion layer. After the cushion layer is applied, a layer of fabric is applied thereto, all of which is done under pressure so as to cause the cushion layer to be forced into the spaces between the cords and cables with the result that a unitary tension layer is provided composed of wires embedded in the cushion layer of rubber or similar material, which in turn is bonded to a layer of fabric. This keeps the cords in good alignment with each other in the belt structure and provides a means whereby in the finished belt there will be no failures due to improper tracking.

All of the heating mechanism which has just been described with reference to applying the cushion layer and the fabric is mounted on a carriage 47 having rollers 48 adapted to travel on the table and suitably guided for movement parallel to the cables, and this particular mounting and guiding is not important insofar as this invention is concerned as the mounting is only important in that it permits the carriage to be moved longitudinally of the table 12 and parallel to the cables.

Looking particularly at Fig. 3, it is to be noted that the carriage 47 is first moved to a position close to the carriage 14 and that the left side of the carriage 47 is provided with two pairs of hooks 49 and 50, only one each of which is shown, the others being aligned therewith on the rear side of the carriage 47. The hooks 50 are first used to support a roll 51 of rubber 87, preferably cushion gum, wrapped in a liner, and, as the material is taken from the roll, the liner is wound on the shaft 52 in a manner well understood in the art. The rubber 87 is fed from the roll 51 downward over the roll 53 on the under side of the carriage and then by means of the presser roll 54, shown more particularly in Fig. 4, it is pressed against the cables, the presser roll forcing the rubber against the cables. Also supported on the carriage 47 by means of cables 55 adapted to be wound on roller 56 is a carrier 57 on which is mounted a bank of heat lamps 58 arranged in a position closely adjacent the rubber as it is being fed downward from the roll 51. The heat from these lamps, which are suitably connected to a source of electrical energy (not shown), softens the rubber and makes the rubber more pliable and this permits the presser roll 54 to press the rubber against the cables and into the spaces therebetween. Similarly mounted is a bank of lamps 59 on a carrier 60 supported by cables 61 wound about the roll 62 which can be rotated to adjust the height of the carrier 60. These lamps are in a position to heat the cables and the coating thereon as the carriage 47 moves over the cables, so that when the rubber is pressed against the cables, the coating, due to its nature, becomes absorbed within the rubber and permits the bonding of the rubber to the cables which are preferably brass-plated.

The carriage is first moved to a position next to the carriage 14 at the tail end of the table, as in Fig. 2, and the end of the rubber is laid on the cords closely adjacent the carriage 14 and then the carriage 47 is traversed to the right toward the head end of the table to progressively apply the rubber to the cables. After the carriage 47 arrives at the head end of the table and occupies the position shown in Fig. 1, the roll of rubber 51 and its liner are removed from the hooks 50 and 49 and placed on a temporary rack which can be provided on the carriage. Then a roll of fabric wound with a liner is placed on hooks 50 in place of the roll of rubber and its liner.

After re-positioning the carriage 47 next to the carriage 14 the fabric is fed to the surface of the rubber covering the cables. It is unnecessary to heat the fabric and therefore the fabric, instead of being fed down over the roller 53, is fed directly to the presser roll 54 over a pulley 63 mounted on the carriage 47 (as indicated by dash-dot lines in Fig. 3) so that the presser roll can press the fabric against the layer of rubber to cause it to adhere to that layer.

The presser roller generally designated as 54 is made up of a series of loosely mounted rings 64, mounted on a shaft 65, which are relatively heavy and are free to move vertically between end plates 66 in a manner such as shown in Patent No. 2,414,021. Any other suitable type of pressing mechanism that will provide means for pressing the material adequately may be used for this purpose but this type of presser roll imparts more or less uniform pressure to all portions of the material throughout the width of the belt, irrespective of small irregularities occurring in the belt in a transverse direction.

While it is possible to feed the cables over the rollers 6, 7 and 17 through the comb 24 and the open jaws of the clamp 11 to the tail end of the table where they could then be attached to the clamping mechanism 13, it is preferred to release the carriage 14 from its fixed position by removing the pin 16 and move the carriage 14 into a position such as shown in dotted lines in Fig. 1. In this position, the cables are connected to the clamping mechanism 13 and then the carriage 14 is moved to the left to the position shown in Fig. 2 or Fig. 3 by the following mechanism: A cable 67 is connected to a bracket 68 on the carriage 14 (see Fig. 6) and this cable is wound on a drum 69 carried by shaft 70 driven by a suitable chain 71 trained over the gears 72 and 73, the latter being driven by an electric motor 74 operating through a reduction gear box 75. By using the motor, sufficient power can be generated to draw the carriage 14 with the attached cables to the left until the carriage again reaches the position shown in full lines in Fig. 2 or 3. As this is being done, the combs keep the cords and cables in alignment and the operators can stop the motor at any time that the feeding mechanism is not operating right or if the cables become snarled or for any other reason. Generally speaking, the carriage is not moved continuously from one end to the other in view of the fact that the movement should be relatively slow to make sure tht the cables do not snarl and become broken as the result of a continuous, uncontrolled pull exerted by the motor.

At the same time that the carriage 14 is being moved from right to left to the position shown in Figs. 2 and 3, it is desirable to also move the carriage 47 and for this purpose it is proposed to provide some sort of a link such as 76 (see Figs. 1 and 3) releasably attached at its ends respectively to the carriages 14 and 47 at 77 and 78 respectively. This link is shown in dotted lines in Fig. 1 to illustrate that it is a releasable connection which could be entirely removed or permanently connected to one carriage and releasably connected to the other. Of course, the carriage 47 could also be moved by hand but it is quite heavy and, in spite of being mounted on rollers, quite difficult to move. The carriage can, if desired, be equipped with a suitable rack and pinion means for moving it longitudinally of the table but this means is not shown in the drawings in order not to confuse an understanding of the apparatus. The provision of such a means is well within the knowledge of one skilled in the art and no specific description is necessary. After the carriage 14 is locked in the position shown in Figs. 2 and 3, each individual cable is tensioned and the clamping mechanism 11 is operated to clamp the cables at the head end of the table in the manner described. Then the rubber and fabric are applied in the manner set forth above.

This completes one section of the belt and the length of the section is dependent upon available floor space and certain other factors which have to do with economy of operation. In a specific example, 150 feet would not be too great an amount to complete in this manner, after which successive sections of similar lengths are completed until a tension section of the desired length is completed and wound on a suitable shaft or roll and transported to another place where the belt is completed.

After one section has been completed, the clamp 11 remains operative while clamping mechanism 13 is rendered inoperative and is returned to the dotted-line position shown in Fig. 1 where it again is used to clamp the cable. The clamping mechanism 11 is then released, after which the carriage 14 is moved to the left as the wires are fed through the machine from the creels and when the carriage 14 reaches the position shown in Figs. 2 and 3, each of the individual cables are again tensioned as previously described and then the clamping mechanism 11 is made operative again. The other operations previously described are then repeated and each successive section of the tension layer for the belt is made in the same manner until the necessary length is obtained.

It is within the purview of this invention to provide separate hooks for the fabric and rubber rolls instead of temporarily mounting one or the other on the hooks 50 while that material is being used. This would merely require extension of the frame to the left in Fig. 3 and the provision of additional hooks and suitable guiding mechanism to direct the material along the paths already described.

In Fig. 2, there is shown a shaft 79 mounted on brackets 80 on which the completed tension section is wound as at 81. The shaft 79 is geared to the shaft 70 by means of a chain 82 or belting which causes the shaft 79 to rotate and wind up the completed tension section in a roll. Preferably, a friction clutch mechanism is used in the gearing connecting the shafts 79 and 70 whereby, as the size of the roll 81 increases, the tension exerted on the material being wound into the roll will remain substantially constant and there will be compensation for the changing diameter of the outside of the roll 81. In order to prevent the layers of the tension section from sticking together when wound onto the roll 81, a roll of liner material 83 is provided, from which liner material is fed in between the layers automatically upon rotation of the shaft 79. Since the shaft 79 is geared to the shaft 70, the material is wound up as the carriage 14 is moved from the head end of the table to the tail end to accomplish simultaneous rolling of the tension section on the shaft 79 while the new sections of the cables are being moved into the position where the rubber and fabric are applied.

As previously pointed out, groups of cords are individually tensioned and clamped at spaced points by clamping mechanism 13 while carriage 14 is in the dotted-line position in Fig. 1. After tensioning one group successive groups are similarly tensioned and clamped until all of the cords throughout the width of the belt have been tensioned to the same degree. Then the carriage 14 is moved to the position shown in Fig. 2 and the rubber and fabric are applied as stated. Next the carriage 14 is moved from the position shown in Fig. 2 to the position shown in dotted lines in Fig. 1. At this position, the clamping mechanism 13 is operated to clamp the cables again and then, after release of the clamping mechanism 11, the carriage 14 is again moved to the left by the cable 67 which is powered by a motor 74 operating through the gearing previously described. When the carriage 14 reaches the position shown in Fig. 2, the pin 16 is then inserted in the bracket 15 to retain the carriage in position and, after tensioning the cables by the weights 18, the clamping mechanism 11 is made operative to clamp the cables and the new section of cables is covered with rubber and fabric as previously described.

It will be understood that while it is also possible to tension the cords in the same manner as the cables, it is not generally necessary to do this, especially since the cords which are usually all cotton, rayon or the like do not carry the load in the driving of the belt and do not tend to kink but merely act as filler cords to fill the spaces between adjacent groups of cables. The cables take up the main tension imparted to the belt. Thus, in the case of the cords it is unnecessary in most instances to tension them to individual tensions of the same amount as the retarding action imparted to the cords by the inertia of the spools and by passage of the cords through the comb as the cords are drawn from the spools, imparts enough tension to the cords to keep them sufficiently straight.

The tension section wound on the shaft 79 can be transferred from the brackets 80 to the brackets 84 on a truck 85 when the desired length of tension section has been made. By means of this truck the section can then be transported to a place where the belt is finished by the application of other layers to the belt if such is desired, after which the belt is vulcanized. Sections of belting can be spliced together to make longer belts or the belt can be made endless by suitable belt fasteners joining the opposite ends thereof.

The carriage 47 is provided on the underside with a comb 86, similar to comb 24, so that as the gum rubber is being laid on the cables and cords, during movement of the carriage from left to right, the cables and cords will be kept in alignment close to the position at which the gum is being applied. This must be removed when the carriage is used to apply the fabric.

While certain representative embodiments and details have been shown for the purpose of illustrating the invention, it will be apparent to those skilled in this art that various changes and modifications may be made therein without departing from the spirit or scope of the invention.

Having thus fully described our invention what we claim and desire to secure by Letters Patent of the United States is:

1. The method of tensioning and aligning parallel tension elements for a belt structure comprising the steps of clamping a group of such elements in desired spaced relation to each other, each at substantially the same longitudinal position, aligning the free unclamped portions of said elements on one side of said clamped portions in substantially parallel relation with each other, individually tensioning each element to the same degree, and then while so aligned and tensioned clamping said tensioned elements at a position along the length of said elements remote from the first clamped portions.

2. The method set forth in claim 1 in which additional adjacent groups of elements are similarly treated and aligned with the first group, each such additional group being individually clamped after alignment and tensioning of the elements in that group.

3. The method set forth in claim 1 which comprises subsequently applying a layer of belt material to the elements while so clamped and tensioned to hold them in spaced relation.

4. The method set forth in claim 1 which comprises subsequently applying a layer of gum stock to the elements while so clamped to hold them in spaced parallel relation when the elements are unclamped.

5. The method set forth in claim 1 which comprises subsequently applying a layer of heated gum stock to the elements while so clamped to hold them in spaced parallel relation independently of the clamping means.

6. The method set forth in claim 4 which comprises heating the elements before application of the gum stock.

7. The method set forth in claim 1 which includes utilizing elements having a heat-softenable coating, and subsequently after aligning of the elements, applying heat to said coating to soften same and subsequently applying a layer of gum stock thereto.

8. The method set forth in claim 1 which includes utilizing elements having a heat-softenable coating, and subsequently after aligning of the elements, applying heat to said coating to soften same and subsequently applying a heated layer of gum stock thereto.

9. The method set forth in claim 4 which comprises the steps of repeating the operation on adjacent longitudinal contiguous portions of the elements progressively until the desired length needed for the belt is obtained.

10. The method set forth in claim 4 which includes the successive steps of unclamping said elements at one point longitudinally thereof after the application of the gum stock thereto, advancing the elements in a direction to bring the other clamped portion to substantially the point at which the elements were unclamped, again tensioning and clamping the elements at spaced points and affixing gum stock thereto, and repeating this operation the required number of times to produce the desired length of coated elements for the belt.

11. The improvement in the method of manufacture of end belts having a plurality of tension elements imbedded therein in substantially parallel arrangement, which comprises clamping each of a group of elements at a given position longitudinally thereof, individually tensioning each tension element to the required tension, then while so tensioned, clamping all of said elements at another longitudinally spaced position, and affixing a layer of belt material to all of said elements between the clamped portions in adhering relation thereto while said elements are so clamped.

12. The method of forming belts which comprises the steps of feeding continuous lengths of tension elements as a group along parallel paths arranged close to each other, clamping all of the tension elements by a first clamping means at a first position along said path, tensioning each tension element to the desired tension and then clamping said group by a second clamping means at a second position spaced substantially from the first position, affixing sheet belt forming material to said group to maintain said elements in spaced relation thereto, thereafter releasing said first clamping means, then reclamping said elements close to said second position by said first clamping means, thereafter releasing the second clamping means at said second position, moving the group of elements bodily while so clamped by moving said first clamping means away from said second clamping means, next tensioning additional portions of the elements and reclamping same at said second position by said second clamping means and applying sheet belt-forming material to said elements to hold said elements aligned.

13. The method set forth in claim 12 in which belt-forming material applied to said elements is in a roll and portions thereof are successively unwound from the roll and applied to successive portions of said elements after they are tensioned and clamped.

14. In apparatus for making belts the combination with a clamping means for clamping a group of elements at a given position along their lengths, of a plurality of similarly constructed element tensioning means each having means thereon for releasably attaching it to an element to impart the necessary tension thereto and while the elements are held by said clamping means to thus individually tension each element, and a second clamping means spaced from said first clamping means and between said latter means and said tensioning means for clamping the elements at a second position while the elements are tensioned, whereby to maintain the tension in said elements between the two clamping means.

15. Apparatus as set forth in claim 14 in which each said clamping means comprises a series of clamping jaws, whereby one group of cords can be clamped by said first clamping means and then tensioned and clamped by said second clamping means and then succeeding groups may be similarly clamped.

16. In apparatus for making belts the combination with a clamping means for clamping a group of elements at a given position along their lengths, of a plurality of similarly constructed element tensioning means each having means thereon for releasably attaching it to an element while imparting the necessary tension thereto and while the elements are held by said clamping means to thus individually tension each element, a second clamping means spaced from said first clamping means and between said latter means and said tension means for clamping the elements at a second position to maintain the tension in said elements between the two clamping means, at least one of said clamping means being mounted for movement toward and from the other whereby said one of said clamping means can be unclamped from said elements, advanced to a position nearer the other clamping means, then re-clamped to grip the elements, and next returned to a position remote from said other clamping means after said other clamping means is released.

17. Apparatus according to claim 14 in which there is a support for sheet belt material adapted to travel over the elements, after tensioning and clamping said elements, to apply said sheet material to said elements.

18. Apparatus according to claim 14 in which there is provided heating means for heating the elements and means for supplying sheet belting material to said elements.

19. Apparatus according to claim 14 in which there is provided heating means for heating the elements, means for supplying sheet belting material to said elements, and means for heating said sheet belting material.

20. A belt building apparatus comprising a pair of movable clamping means for clamping groups of tension elements for a belt at spaced points, means mounting at least one of said clamping means for guided movement toward and away from the other clamping means, each clamping means comprising similar series of separate clamping elements, pairs of said clamping elements, one on each clamping means, being adapted to clamp a group of tension elements independently of the clamping of other groups for the same belt, other pairs being used for similarly clamping other groups and means for individually tensioning each individual tension element in a group prior to final clamping of each group of tension elements.

21. A belt building apparatus comprising a pair of movable clamping means for clamping groups of tension elements for a belt at spaced points, means mounting at least one of said clamping means for guided movement toward and away from the other clamping means, each clamping means comprising similar series of separate clamping jaws, pairs of said clamping jaws, one on each clamping means, being adapted to clamp a group of tension elements independently of the clamping of other groups for the same belt, other pairs being used for similarly clamping other groups and means for individually tensioning each individual tension element in a group prior to final clamping of each group of tension elements comprising individual weights adapted to be attached to said elements.

22. A belt building apparatus comprising a pair of movable clamping means for clamping groups of tension elements for a belt at spaced points, means mounting at least one of said clamping means for guided movement toward and away from the other clamping means, each clamping means comprising similar series of separate clamping jaws, pairs of said clamping jaws, one on each clamping means, being adapted to clamp a group of tension elements independently of the clamping of other groups for the same belt, other pairs being used for similarly clamping other groups a roller over which said elements are trained in advance of said clamping means, and means for individually tensioning each individual tension element in a group prior to clamping the group of tension elements, comprising individual weights adapted to be attached to the tension elements or a portion thereof near the roller on the side thereof away from the clamping means.

23. In a belt building apparatus, the combination with means for tensioning clamping and aligning a series of tension elements for said belt, of a sheet material applying device comprising a carriage for supporting a supply of said sheet material, said carriage being mounted for movement substantially parallel with said elements when they are clamped and aligned for applying a layer of said sheet material to said elements as said carriage moves parallel thereto.

24. A belt building apparatus as set forth in claim 23 in which there is heating means associated with the apparatus for heating said sheet material as it is applied to said elements.

25. A belt building apparatus as set forth in claim 23 in which there is means on said carriage for heating said sheet material as it is applied to said elements.

26. A belt building apparatus as set forth in claim 23 which includes heating means associated with the apparatus for heating the elements adjacent the position at which the sheet material is applied.

27. A belt building apparatus as set forth in claim 23 in which there is means on said carriage for heating the sheet material and elements as the sheet material is being applied to said elements.

28. In a belt building apparatus, the combination with means for laying a multiplicity of tension elements in parallel arrangement, of clamping means for clamping said elements at spaced positions longitudinally thereof, comprising a plurality of clamping jaws arranged at each of said spaced positions, the clamping jaws at each position being mounted in a series transversely of the longitudinal dimension of said elements, and means for individually and independently moving each of said jaws.

29. A belt building apparatus as set forth in claim 28 in which each jaw of a series at one position is arranged in longitudinal alignment with a jaw of the other series, whereby the same group of elements can be clamped by pairs of aligned jaws of both series independently of the other pairs of jaws in the series.

30. A belt building apparatus comprising a work table over which tension elements are to be fed, a creel rack for mounting spools of tension elements, a guide for aligning the tension elements as they are fed on to said table, separate guides for each of a group of elements fed from said spools to said table arranged to provide temporary increased spacing between said elements beyond the spacing desired in the belt, and tension imparting means individual to each element, and means thereon to grip an element and impart tension thereto independently of the other elements in the group and while the elements are in their positions of greater spacing.

31. Apparatus according to claim 30 in which the means for providing increased spacing between the elements comprises pairs of guides for each tension element of a group of elements, arranged so that each pair is spaced from others longitudinally of the general direction of movement of the tension elements from the creels to the table, and each guide of a pair is spaced from the other in a direction transversely to the longitudinal spacing of the pairs.

32. Apparatus as set forth in claim 30 in which the same guides are successively used for different transverse groups of said elements and in which means is provided to align the guides laterally with different transverse groups of elements.

33. Apparatus for building belts comprising a table upon which belt tension elements are to be laid, means for clamping said elements comprising at least two clamps spaced longitudinally of said table, at least one of said clamps being movable longitudinally of said table, whereby after clamping a group of elements it may be moved along said table to advance the elements over said table before same are clamped by a second clamp, a carriage for conveying sheet material to be applied to said elements, mounted for movement parallel to said first clamp, and means for detachably coupling said first clamp to said carriage so that said clamp and carriage will move in unison over said table as the clamp is advanced to position the elements, the carriage being independently movable when detached from said clamp, whereby sheet material may be applied to said elements between said clamps as the carriage is independently moved away from the clamp to which it was detachably connected.

References Cited in the file of this patent

UNITED STATES PATENTS

| Number | Name | Date |
| --- | --- | --- |
| 1,742,777 | Midgley | Jan. 7, 1930 |
| 1,813,876 | Gerstenslager | July 7, 1931 |
| 2,239,635 | Walton Jr. | Apr. 22, 1941 |
| 2,321,580 | Conradson | June 15, 1943 |
| 2,429,993 | Crosby | Nov. 4, 1947 |
| 2,512,762 | Benson et al. | June 27, 1950 |
| 2,522,722 | Mitchell | Sept. 19, 1950 |
| 2,540,201 | Haren | Feb. 6, 1951 |
| 2,565,684 | Haren et al. | Aug. 28, 1951 |
| 2,637,895 | Blaton | May 12, 1953 |